(12) United States Patent
Kamiyama et al.

(10) Patent No.: US 8,797,513 B2
(45) Date of Patent: Aug. 5, 2014

(54) DISTANCE MEASURING SYSTEM AND DISTANCE MEASURING METHOD

(71) Applicant: Honda Motor Co., Ltd., Tokyo (JP)

(72) Inventors: Tomoyuki Kamiyama, Wako (JP); Keisuke Korekado, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 13/721,968

(22) Filed: Dec. 20, 2012

(65) Prior Publication Data

US 2013/0162973 A1   Jun. 27, 2013

(30) Foreign Application Priority Data

Dec. 27, 2011   (JP) .................................. 2011-285199

(51) Int. Cl.
*G01C 3/08* (2006.01)
*G01S 7/491* (2006.01)
*G01S 17/88* (2006.01)

(52) U.S. Cl.
CPC ................. *G01C 3/08* (2013.01); *G01S 7/4913* (2013.01); *G01S 7/4915* (2013.01); *G01S 17/88* (2013.01)
USPC ....... 356/5.01; 356/3.01; 356/3.15; 356/4.01; 356/4.1; 356/5.1

(58) Field of Classification Search
CPC ....... G01C 3/08; G01S 7/4913; G01S 7/4915; G01S 17/88
USPC ............. 356/3.01–3.15, 4.01–4.1, 5.01–5.15, 356/6–22, 28, 28.5
See application file for complete search history.

(56) References Cited

U.S. PATENT DOCUMENTS 7,791,715 B1 *   9/2010   Bamji ............................ 356/5.1
2006/0192938 A1   8/2006   Kawahito

FOREIGN PATENT DOCUMENTS

JP   2004-294420 A   10/2004

* cited by examiner

*Primary Examiner* — Luke Ratcliffe
(74) *Attorney, Agent, or Firm* — Squire Patton Boggs (US) LLP

(57) ABSTRACT

In a distance measuring system, photoelectrons are generated depending on light energy received in a light-receiving period predetermined for the emission timing of pulsed light emitted to a target object and are cumulatively stored, and a distance to the target object is determined according to a time-of-flight process. A solid-state image sensing device cumulatively stores therein photoelectrons generated depending on the light energy received in each of the first and second light-receiving periods. The first light-receiving period is part of a rise period of the reflected light intensity received by the image sensing device, and the second light-receiving period includes a peak of the reflected light intensity and a fall period thereof. An arithmetic processing unit determines the distance to the object using a light energy ratio obtained by dividing information concerning photoelectrons stored in the second light-receiving period by information concerning photoelectrons stored in the first light-receiving period.

10 Claims, 12 Drawing Sheets

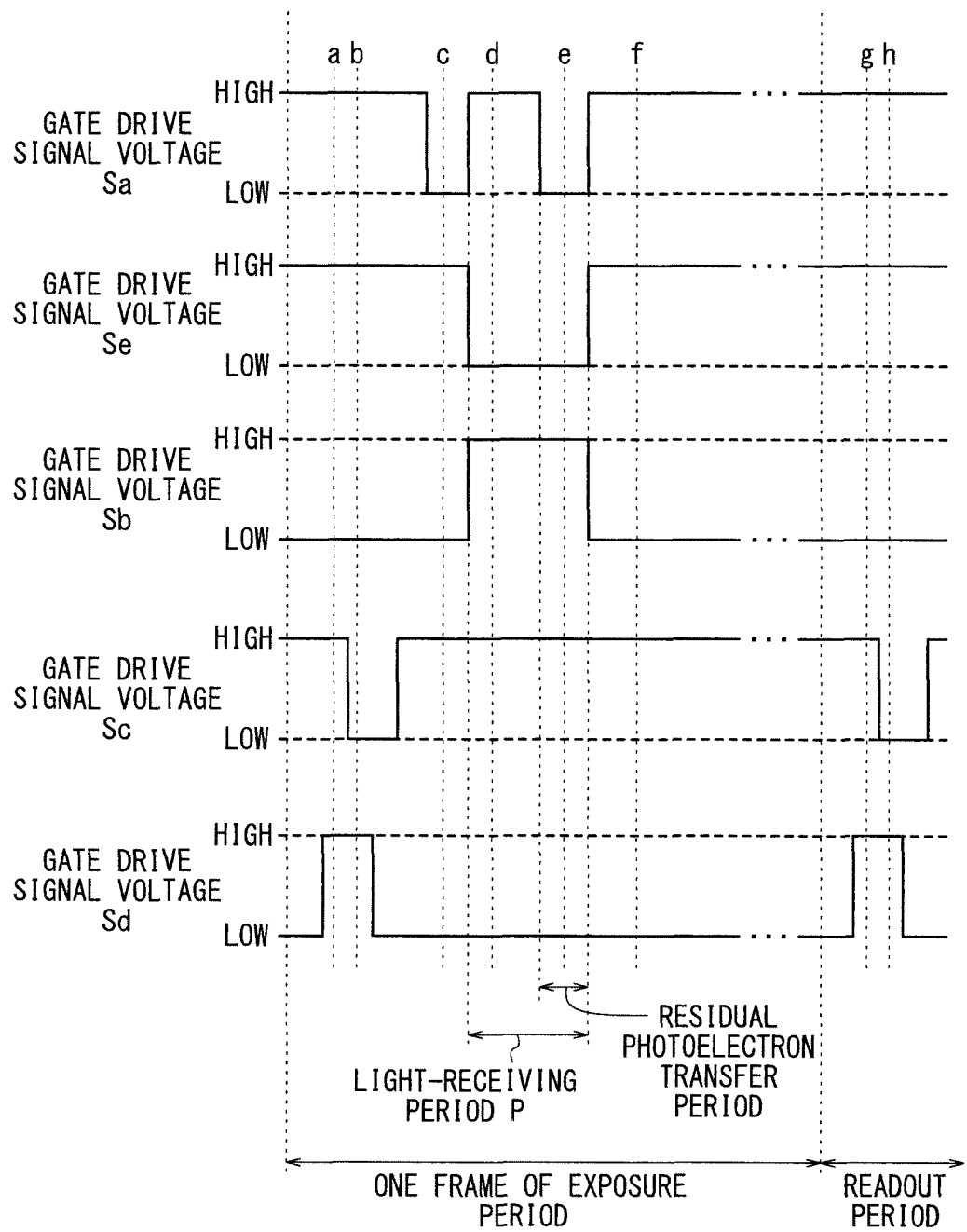

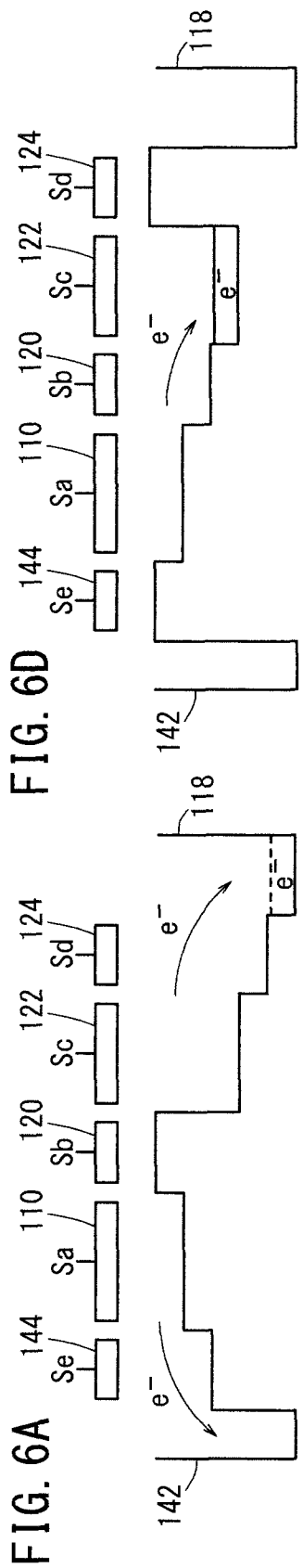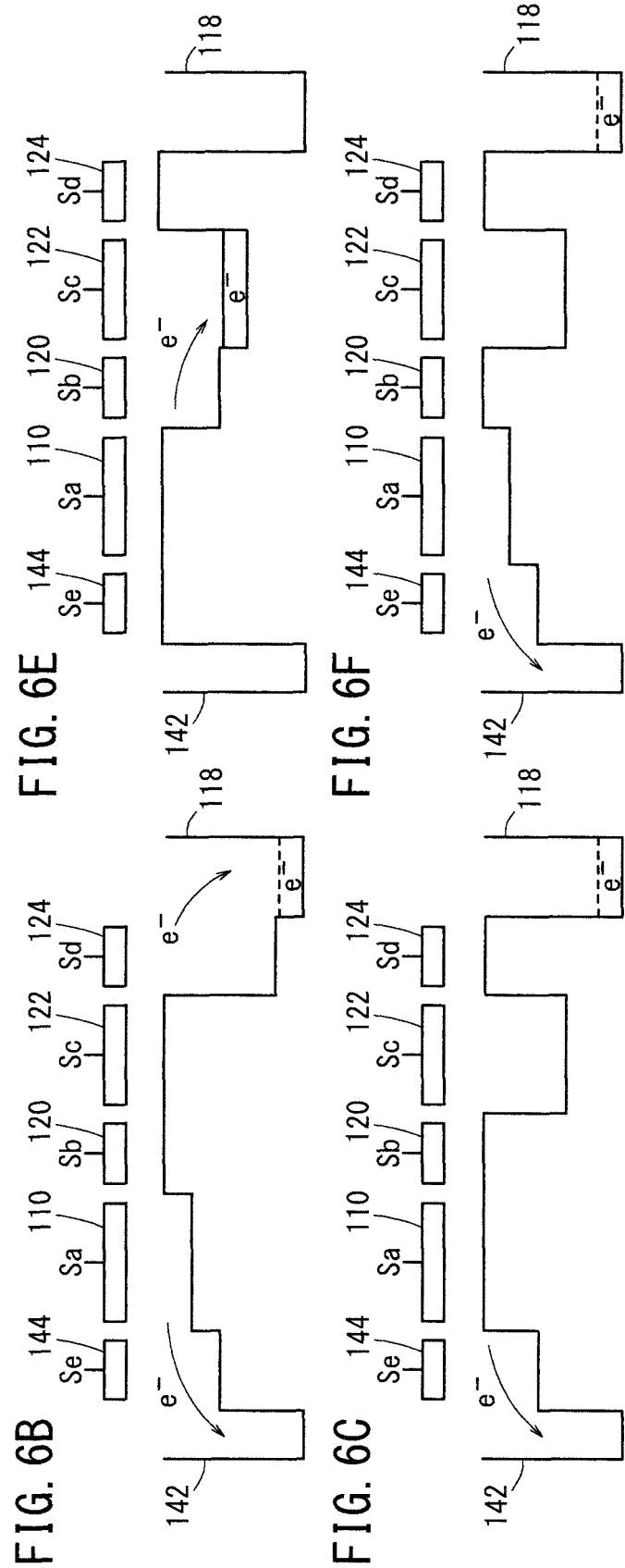

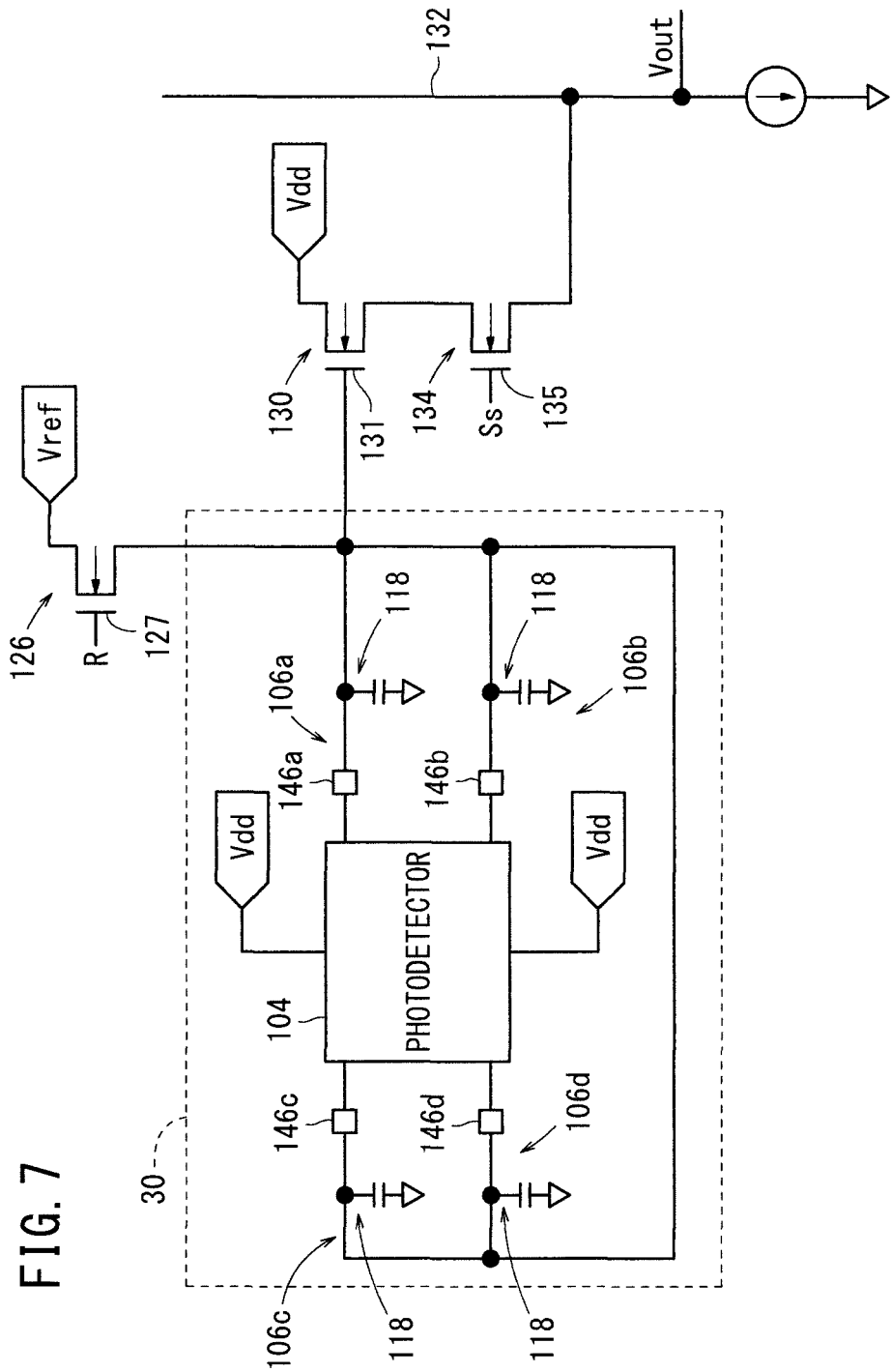

DISTANCE MEASURING SYSTEM AND DISTANCE MEASURING METHOD

CROSS-REFERENCE TO RELATED APPLICATION

This application is based upon and claims the benefit of priority from Japanese Patent Application No. 2011-285199 filed on Dec. 27, 2011, the contents of which are incorporated herein by reference.

BACKGROUND OF THE INVENTION

1. Field of the Invention

The present invention relates to a distance measuring system containing a solid-state image sensing device functioning as a distance measuring sensor and also relates to a distance measuring method.

2. Description of the Related Art

Known conventional applications of image sensors include technologies using a time-of-flight (TOF) method for measuring a distance to a target object in a contactless manner. In one known technology using the TOF method, photoelectrons (negative electric charge) generated in a photoelectric conversion element are allocated and then read out. The emission waveform of an LED does not rise and fall sharply but gradually at a slope, and this property is utilized in Japanese Laid-Open Patent Publication No. 2004-294420. This patent document discloses that a distance is measured using stored photoelectrons generated by a pulsed light received in a rise time period during which the intensity of the pulsed light changes and also using stored photoelectrons generated by a pulsed light received in a time period during which the intensity of the pulsed light is constant.

SUMMARY OF THE INVENTION

However, in the technique of Japanese Laid-Open Patent Publication No. 2004-294420, when a target object is located at a smaller distance, an emitted light is reflected and returns as a reflected light in a shorter time. Therefore, the reflected light is received over a longer time and has a higher intensity due to the smaller distance. Thus, the number of photoelectrons generated by photoelectric conversion of the reflected light is increased. On the other hand, when the target object is located at a larger distance, the emitted light is reflected and returns as the reflected light in a longer time. Therefore, the reflected light is received only for a shorter time and has a lower intensity since such a larger distance weakens the irradiation intensity to the target object. Thus, the number of photoelectrons generated by photoelectric conversion of the reflected light is decreased. Consequently, in order to detect the target object located at a smaller distance, a capacitor with a higher capacity is required in a holding unit for holding the photoelectrons to prevent the saturation. On the other hand, in order to detect the target object located at a larger distance, it is necessary to increase the detection sensitivity. Thus, a large dynamic range is required in a readout circuit.

Accordingly, in view of the above problem of the conventional technology, an object of the present invention is to provide a distance measuring system and a distance measuring method capable of improving the distance measurement accuracy while preventing receiving of a light that is unuseful for distance detection.

According to the present invention, there is provided a distance measuring system having an irradiation unit for emitting a pulsed light to a target object, wherein the pulsed light is reflected by the target object, a solid-state image sensing device for generating photoelectrons depending on the energy of the reflected light received in a light-receiving period predetermined for the emission timing of the pulsed light, and cumulatively storing therein the generated photoelectrons, and an arithmetic processing unit for determining a distance to the target object according to a time-of-flight process using information concerning the photoelectrons cumulatively stored in the solid-state image sensing device. The light-receiving period includes first and second light-receiving periods. The solid-state image sensing device cumulatively stores therein photoelectrons generated depending on the energy of the light received in the first light-receiving period, and also cumulatively stores therein photoelectrons generated depending on the energy of the light received in the second light-receiving period. The first light-receiving period is a part of a rise period during which the intensity of the reflected light received by the solid-state image sensing device rises, and the second light-receiving period includes a peak point of the intensity of the reflected light received by the solid-state image sensing device and a fall period during which the intensity thereof falls. The arithmetic processing unit determines the distance to the target object using a light energy ratio obtained by dividing information concerning the photoelectrons cumulatively stored in the second light-receiving period by information concerning the photoelectrons cumulatively stored in the first light-receiving period.

The first light-receiving period may be shorter than the second light-receiving period.

The distance measuring system may further have a table storing therein the light energy ratios corresponding to various distances to the target object.

The solid-state image sensing device may not store, but discharge photoelectrons generated depending on the energy of the light received in periods other than the light-receiving period.

The irradiation unit may emit the pulsed light a predetermined number of times, and the first and second light-receiving periods may be predetermined for each emission timing of the pulsed lights. In this case, the solid-state image sensing device may accumulate and cumulatively store therein photoelectrons generated depending on the energies of the lights received in the first light-receiving periods, and the solid-state image sensing device also may accumulate and cumulatively store therein photoelectrons generated depending on the energies of the lights received in the second light-receiving periods. The arithmetic processing unit may determine the light energy ratio by dividing information concerning the photoelectrons cumulatively stored in the second light-receiving periods by information concerning the photoelectrons cumulatively stored in the first light-receiving periods.

The light-receiving period may further include a third light-receiving period having the same length as the first light-receiving period, and a fourth light-receiving period having the same length as the second light-receiving period. Only an ambient light is received by the solid-state image sensing device in each of the third and fourth light-receiving periods. In this case, the solid-state image sensing device may further cumulatively store therein photoelectrons generated depending on the energy of the ambient light received in the third light-receiving period, and the solid-state image sensing device may still further cumulatively store therein photoelectrons generated depending on the energy of the ambient light received in the fourth light-receiving period. The arithmetic processing unit may determine the light energy ratio by dividing a value obtained by subtracting information concerning the photoelectrons cumulatively stored in the fourth light-receiving period from information concerning the photoelectrons cumulatively stored in the second light-receiving period, by a value obtained by subtracting information concerning the photoelectrons cumulatively stored in the third light-receiving period from information concerning the photoelectrons stored in the first light-receiving period.

The irradiation unit may emit the pulsed light a predetermined number of times, and the first, second, third, and fourth light-receiving periods may be predetermined for each emission timing of the pulsed light. In this case, the solid-state image sensing device may accumulate and cumulatively store therein photoelectrons generated depending on the energies of the lights received in the first light-receiving periods, the solid-state image sensing device may also accumulate and cumulatively store therein photoelectrons generated depending on the energies of the lights received in the second light-receiving periods, the solid-state image sensing device may further accumulate and cumulatively store therein photoelectrons generated depending on the energies of the lights received in the third light-receiving periods, and the solid-state image sensing device may still further accumulate and cumulatively store therein photoelectrons generated depending on the energies of the lights received in the fourth light-receiving periods. The arithmetic processing unit may determine the light energy ratio by dividing a value obtained by subtracting information concerning the photoelectrons cumulatively stored in the fourth light-receiving periods from information concerning the photoelectrons cumulatively stored in the second light-receiving periods, by a value obtained by subtracting information concerning the photoelectrons cumulatively stored in the third light-receiving periods from information concerning the photoelectrons cumulatively stored in the first light-receiving periods.

The light-receiving period predetermined for the emission timing of the pulsed light may be determined based on a predetermined distance-measurement detection range.

The distance measuring system may have a plurality of different distance-measurement detection ranges. In this case, the light-receiving start timing of the light-receiving period may differ depending on the distance-measurement detection ranges. The distance-measurement detection range may be switched at least for each frame of exposure period. The one frame of exposure period may include a plurality of the first light-receiving periods and the second light-receiving periods.

According to the present invention, there is further provided a distance measuring method carried out using a distance measuring system. The distance measuring system includes: an irradiation unit for emitting a pulsed light to a target object, wherein the pulsed light is reflected by the target object; a solid-state image sensing device for generating photoelectrons depending on the energy of the reflected light received in a light-receiving period predetermined for the emission timing of the pulsed light, and cumulatively storing therein the generated photoelectrons; and an arithmetic processing unit for determining a distance to the target object according to a time-of-flight process using information concerning the photoelectrons cumulatively stored in the solid-state image sensing device. The light-receiving period includes first and second light-receiving periods. The first light-receiving period is a part of a rise period during which the intensity of the reflected light received by the solid-state image sensing device rises, and the second light-receiving period includes a peak point of the intensity of the reflected light received by the solid-state image sensing device and a fall period during which the intensity falls. The distance measuring method includes: with the solid-state image sensing device, cumulatively storing therein photoelectrons generated depending on the energy of the light received in the first light-receiving period, and also cumulatively storing therein photoelectrons generated depending on the energy of the light received in the second light-receiving period; and with the arithmetic processing unit, determining the distance to the target object using a light energy ratio obtained by dividing information concerning the photoelectrons cumulatively stored in the second light-receiving period by information concerning the photoelectrons cumulatively stored in the first light-receiving period.

In the present invention, in the solid-state image sensing device, photoelectrons corresponding to the energy of the light received in the first light-receiving period are generated and cumulatively stored, and photoelectrons corresponding to the energy of the light received in the second light-receiving period are generated and cumulatively stored. The first light-receiving period is a part of the rise period during which the intensity of the reflected light received by the solid-state image sensing device rises, and the second light-receiving period includes the peak point of the intensity of the reflected light received by the solid-state image sensing device and the fall period during which the intensity thereof falls. In the arithmetic processing unit, the distance to the target object is determined using the light energy ratio, which is obtained by dividing the information concerning the photoelectrons cumulatively stored in the second light-receiving period by the information concerning the photoelectrons cumulatively stored in the first light-receiving period. Thus, the distance to the target object can be determined without regard for the light source of the irradiation unit, the reflectance of the target object, and the like. Furthermore, the resolution of the light energy ratio with respect to the distance can be increased to improve the distance-measurement accuracy.

In addition, the first light-receiving period is a part of the raise period in which the intensity of the reflected light injected into the solid-state image sensing device is raised, and the second light-receiving period includes the peak of the intensity of the reflected light injected into the solid-state image sensing device and the drop period. Thus, when the target object is located at a smaller distance, the solid-state image sensing device receives the reflected light only for a shorter time, so that the number of the photoelectrons generated therein can be reduced.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a timing chart of various basic gate drive signal voltages supplied to a photodetector, a photoelectron distributor, and a photoelectron discharger in photoelectron transfer;

FIG. 6A is a potential diagram of the photodetector, the photoelectron distributor, and the photoelectron discharger at timings a and g;

FIG. 6B is a potential diagram of the photodetector, the photoelectron distributor, and the photoelectron discharger at timings b and h;

FIG. 6C is a potential diagram of the photodetector, the photoelectron distributor, and the photoelectron discharger at a timing c;

FIG. 6D is a potential diagram of the photodetector, the photoelectron distributor, and the photoelectron discharger at a timing d;

FIG. 6E is a potential diagram of the photodetector, the photoelectron distributor, and the photoelectron discharger at a timing e;

FIG. 6F is a potential diagram of the photodetector, the photoelectron distributor, and the photoelectron discharger at a timing f;

FIG. 7 is a view of a circuit structure of the unit pixel;

DESCRIPTION OF THE PREFERRED EMBODIMENTS

A distance measuring method and a distance measuring system for realizing the method according to a preferred embodiment of the present invention will be described in detail below with reference to the accompanying drawings.

Figure 1:
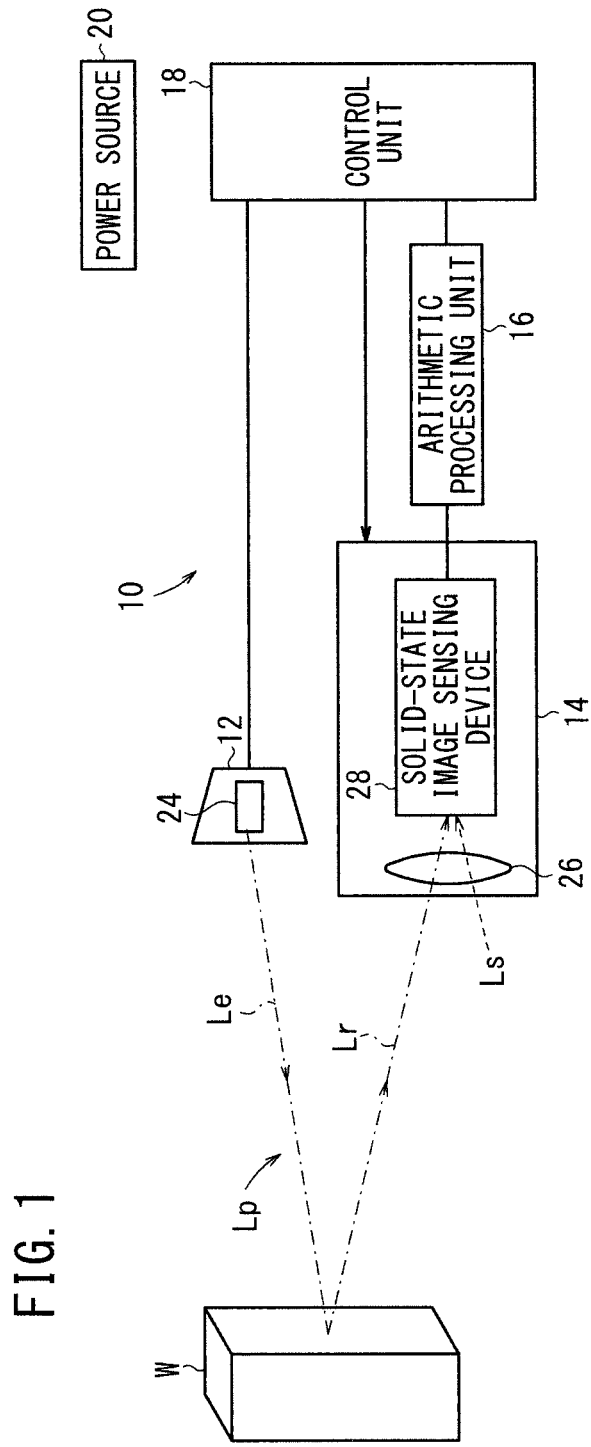
FIG. 1 is a schematic structural view of a distance measuring system using a solid-state image sensing device according to an embodiment of the present invention.

FIG. 1 is a schematic structural view of a distance measuring system 10 using a solid-state image sensing device according to the embodiment. As shown in FIG. 1, the distance measuring system 10 has an irradiation unit 12, an image capturing unit 14, an arithmetic processing unit 16, a control unit 18, and a power source 20.

The power source 20 is for supplying a predetermined power-supply voltage to each component of the distance measuring system 10. For the sake of brevity, power supply lines extending from the power source 20 to the units are omitted in FIG. 1.

The irradiation unit 12 acts to emit a pulsed light Lp to a target object W, and has a light emitter (light source) 24 that outputs the pulsed light Lp under control of the control unit 18. The light emitter 24 may contain a capacitor and a light-emitting device. Electric charges stored in the capacitor are supplied to a light-emitting diode or the like to emit a light.

The light emitter 24 emits an infrared light. For example, the light emitter 24 can emit an infrared light having a wavelength of 870 nanometers (nm) at an output level of 100 watts (W). The light emitter 24 can emit the pulsed light Lp with an output time (pulse duration) of 100 nanoseconds (ns).

The light emitter 24 may have a plurality of light-emitting spots arranged in a linear array or a matrix. A laser diode or a light-emitting diode (LED) may be used as the light-emitting device.

In the distance measuring system 10, the pulsed light Lp emitted from the irradiation unit 12 is reflected by the target object W and then incident on the image capturing unit 14. For illustrative purposes, the pulsed light Lp between the irradiation unit 12 and the target object W is referred to as the emitted light Le, and the pulsed light Lp between the target object W and the image capturing unit 14 is referred to as the reflected light Lr.

The image capturing unit 14 has a lens 26 and a solid-state image sensing device 28. The reflected light Lr and the ambient light Ls pass through the lens 26, and are collected and detected in the solid-state image sensing device 28. The solid-state image sensing device 28 is sensitive to the ambient light Ls and the pulsed light Lp emitted from the irradiation unit 12. In the arithmetic processing unit 16, the distance to the target object W is calculated based on information on the number Q of photoelectrons stored in the solid-state image sensing device 28 in a light-receiving period P. The control unit 18 and the arithmetic processing unit 16 may be disposed on the solid-state image sensing device 28.

Figure 2:
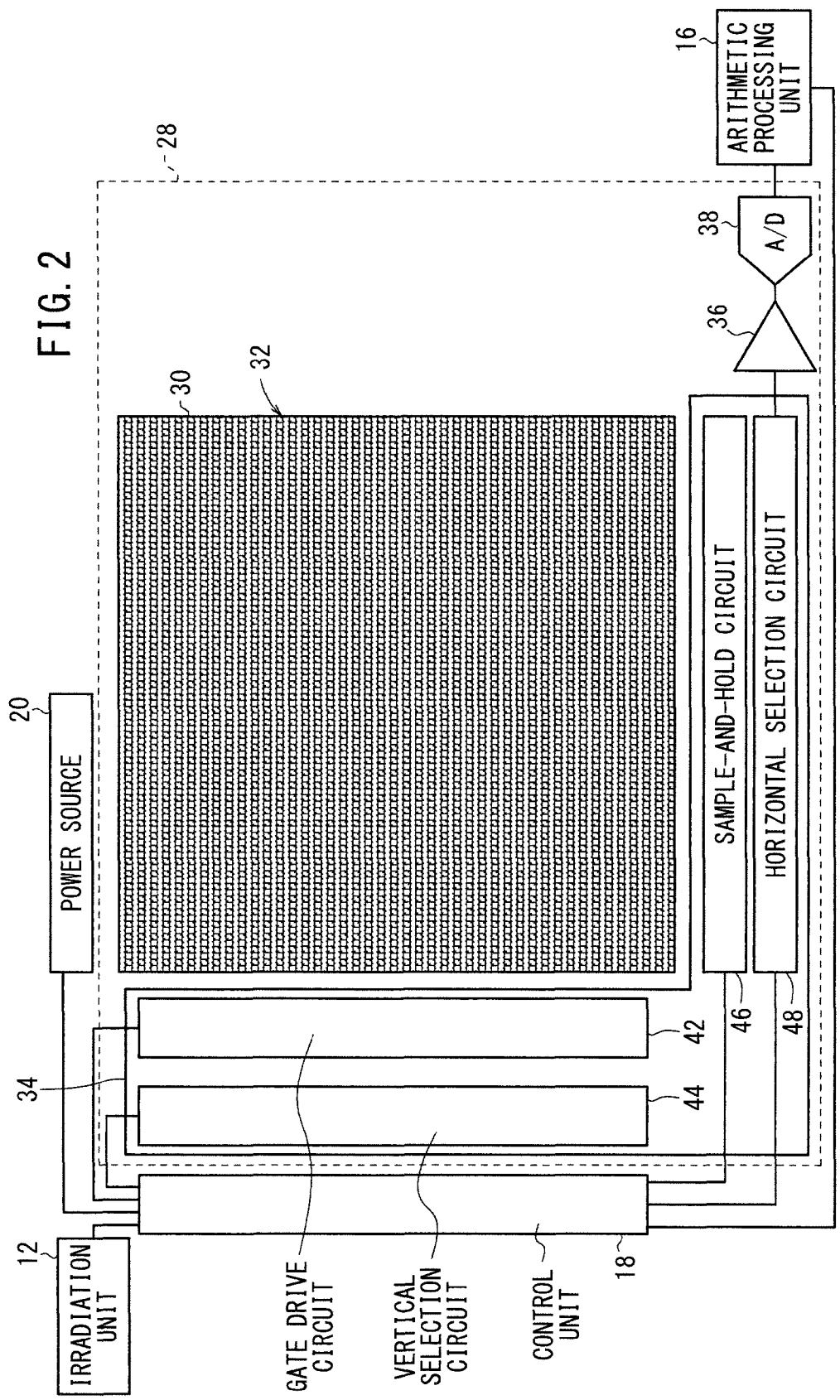
FIG. 2 is a structural view of the solid-state image sensing device of FIG. 1.

FIG. 2 is a structural view of the solid-state image sensing device 28. The solid-state image sensing device 28 has a pixel array 32 containing a matrix of unit pixels 30, pixel drive circuits (pixel drivers) 34, an output buffer 36, and an A/D converter 38.

The power source 20 applies a positive power-supply voltage Vdd and a resetting voltage Vref to the pixel array 32. The pixel drive circuits 34 have a gate drive circuit 42, a vertical selection circuit 44, a sample-and-hold circuit 46, and a horizontal selection circuit 48. The gate drive circuit 42 outputs various gate drive signals to generate (store), hold, transfer, and discharge photoelectrons in each unit pixel 30 in the pixel array 32. The vertical selection circuit 44 has a multiplexer (not shown), selects a row containing a unit pixel 30 to be read, and makes the unit pixel 30 output a voltage signal QV corresponding to the number Q of photoelectrons held by the unit pixel 30. The horizontal selection circuit 48 has another multiplexer (not shown) and selects a column containing the unit pixel 30 to be read. The read pixel signal is held in the sample-and-hold circuit 46 and then output through the horizontal selection circuit 48. Then, the pixel signal is output through the output buffer 36 and the A/D converter 38 to the arithmetic processing unit 16. The gate drive circuit 42, the vertical selection circuit 44, the sample-and-hold circuit 46, and the horizontal selection circuit 48 are operated under control of the control unit 18.

Figure 3:
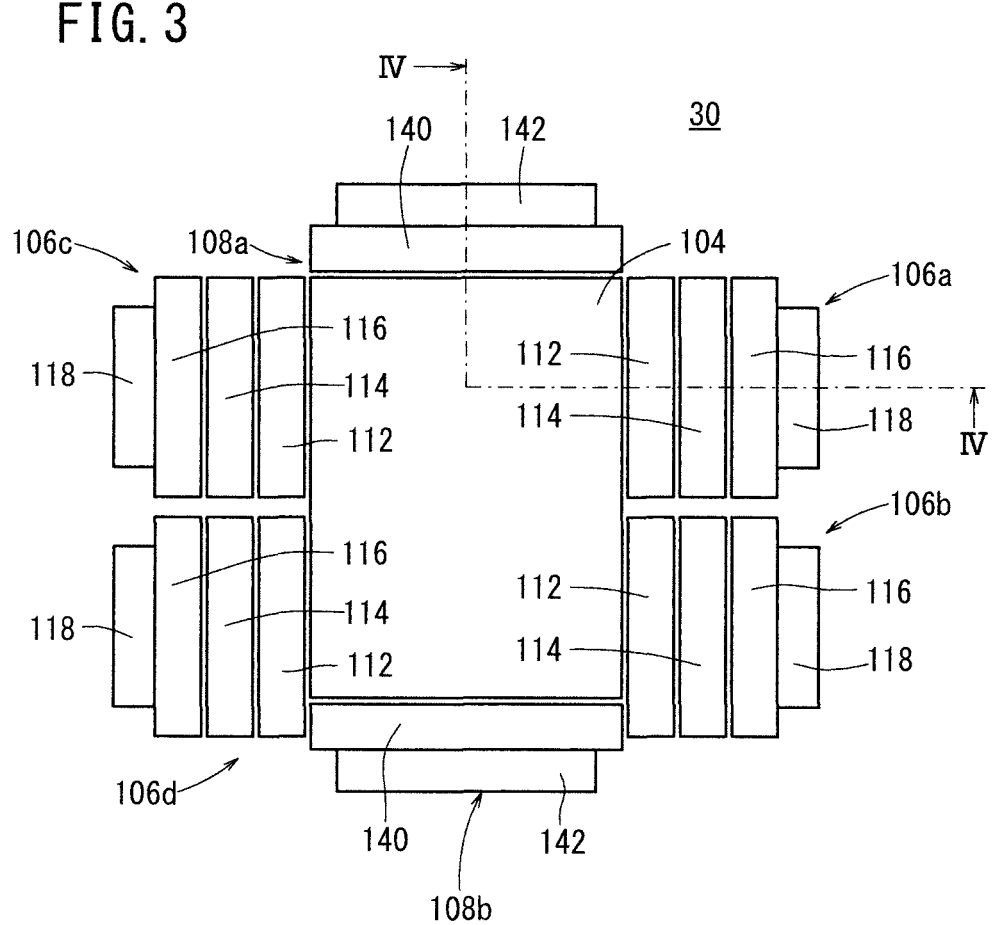
FIG. 3 is a partial plan view of one unit pixel in the solid-state image sensing device of FIG. 2.
Figure 4:
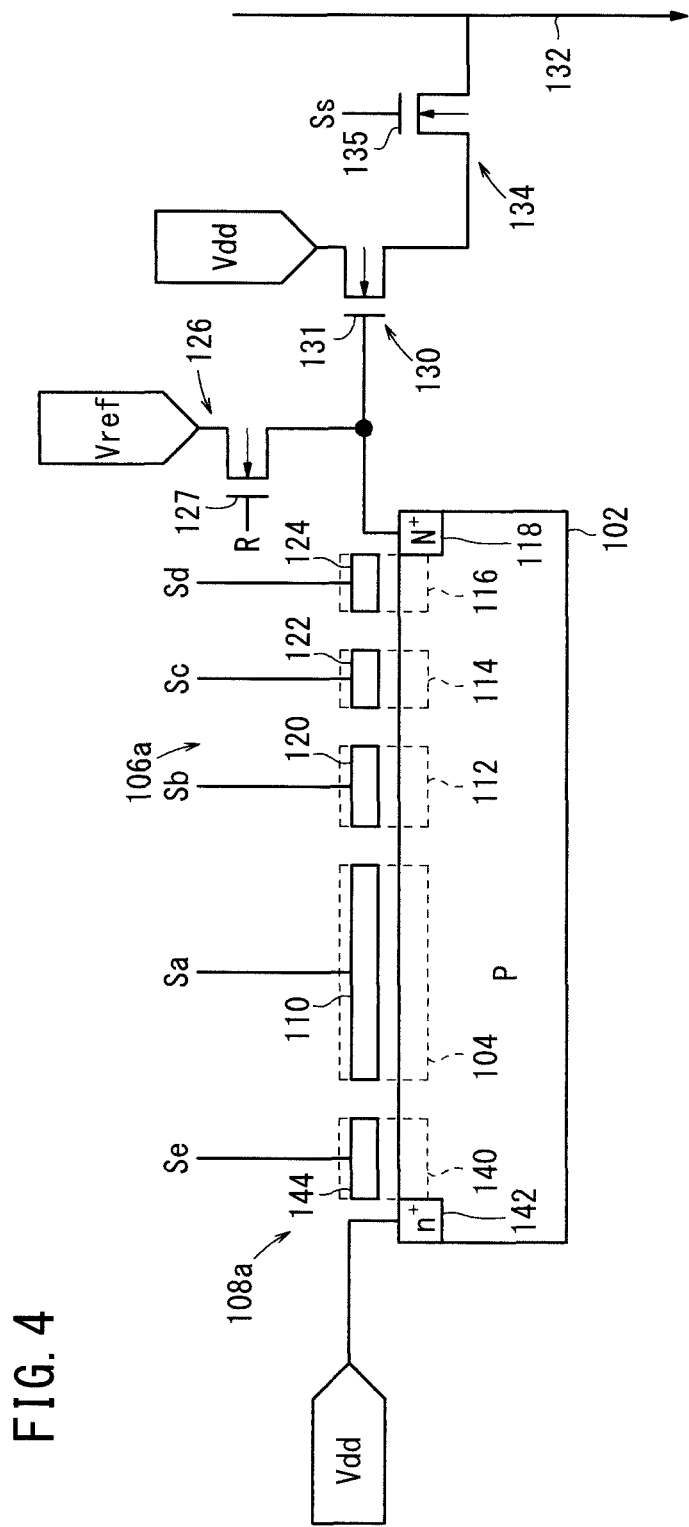
FIG. 4 is a structural cross-sectional view taken along the line IV-IV in FIG. 3.

FIG. 3 is a partial plan view of one unit pixel of the solid-state image sensing device 28 of FIG. 2. FIG. 4 is a structural cross-sectional view taken along the line IV-IV in FIG. 3. Photoelectron distributors 106a, 106b, 106c, and 106d have the same structure, and photoelectron dischargers 108a and 108b have the same structure. Therefore, the photoelectron distributors 106b, 106c, and 106d and the photoelectron discharger 108b are not shown in the structural cross-sectional view.

The unit pixel 30 has a photodetector 104, the four photoelectron distributors 106a, 106b, 106c, and 106d (hereinafter referred to also collectively as the photoelectron distributors 106), and the two photoelectron dischargers 108a and 108b (hereinafter referred to also collectively as the photoelectron dischargers 108), which are formed on a p-type (first-conductivity-type) semiconductor substrate 102. The photodetector 104 has a photogate structure containing an electrode (hereinafter referred to as photogate) 110, which is formed on the p-type (first-conductivity-type) semiconductor substrate 102 with an insulator (not shown) interposed therebetween (see FIG. 4). The photodetector 104 is capable of detecting a light and generating photoelectrons (negative electric charge) (converting the detected light to the photoelectrons). A gate drive signal voltage Sa for driving the photodetector 104 is applied to the photogate 110 by the gate drive circuit 42.

Each of the photoelectron distributors 106 has a first transfer unit 112, a photoelectron hold unit 114, a second transfer unit 116, and a floating diffusion layer 118. The first transfer unit 112 has an MOS diode structure containing an electrode (hereinafter referred to as first transfer gate) 120, which is formed on the p-type semiconductor substrate 102 with the insulator (not shown) interposed therebetween, for allocating the photoelectrons generated in the photodetector 104 and transferring the generated photoelectrons to the photoelectron hold unit 114 (see FIG. 4). A gate drive signal voltage Sb for driving the first transfer unit 112 is input from the gate drive circuit 42 to the first transfer gate 120.

The photoelectron hold unit 114 is located on one side of the photodetector 104 with the first transfer unit 112 interposed therebetween. The photoelectron hold unit 114 has an MOS diode structure containing an electrode (hereinafter referred to as hold gate) 122, which is formed on the p-type semiconductor substrate 102 with the insulator (not shown) interposed therebetween, for temporarily collecting and holding the photoelectrons generated in the photodetector 104 (see FIG. 4). A gate drive signal voltage Sc for driving the photoelectron hold unit 114 is input from the gate drive circuit 42 to the hold gate 122.

The second transfer unit 116 is located on one side of the first transfer unit 112 with the photoelectron hold unit 114 interposed therebetween. The second transfer unit 116 has an MOS diode structure containing an electrode (hereinafter referred to as second transfer gate) 124, which is formed on the p-type semiconductor substrate 102 with the insulator (not shown) interposed therebetween, for transferring the photoelectrons stored in the photoelectron hold unit 114 (see FIG. 4). A gate drive signal voltage Sd for driving the second transfer unit 116 is applied from the gate drive circuit 42 to the second transfer gate 124.

The floating diffusion (FD) layer 118 is located on one side of the photoelectron hold unit 114 with the second transfer unit 116 interposed therebetween. The floating diffusion layer 118 is used for temporarily holding the photoelectrons transferred from the photoelectron hold unit 114 and converting the photoelectrons to a voltage. The floating diffusion layer 118 is formed by forming an n-type (second-conductivity-type) impurity region in the p-type semiconductor substrate 102.

As shown in FIG. 3, each pair of the four photoelectron distributors 106 are arranged in the horizontal direction (the right-left direction) symmetrically with respect to the photodetector 104, and the pairs of the four photoelectron distributors 106 are arranged in the up-down direction.

As shown in FIG. 4, the floating diffusion layer 118 is connected to a reset transistor (reset part) 126 for resetting the potential of the floating diffusion layer 118 to a reference potential. The floating diffusion layer 118 is connected to the source of the reset transistor 126, the resetting voltage Vref is applied from the power source 20 to the drain, and a resetting signal R is supplied from the gate drive circuit 42 to the gate (reset gate) 127 of the reset transistor 126. When a high resetting signal R is supplied to the reset gate 127, the reset transistor 126 is turned on, whereby the photoelectrons in the floating diffusion layer 118 are discharged to reset the potential of the floating diffusion layer 118 to the reference potential.

Further, the floating diffusion layer 118 is connected to a signal read transistor 130 for reading the voltage signal QV corresponding to the number Q of photoelectrons stored in the floating diffusion layer 118. The signal read transistor 130 is connected to a selection transistor 134 for selecting whether the voltage signal read by the signal read transistor 130 is output or not to a signal read line 132. The power-supply voltage Vdd is applied from the power source 20 to the drain of the signal read transistor 130. The gate (signal read gate) 131 of the signal read transistor 130 is connected to the floating diffusion layer 118, and the source is connected to the drain of the selection transistor 134. When a high selection signal Ss is supplied from the vertical selection circuit 44 to a gate (selection gate) 135 of the selection transistor 134, the selection transistor 134 is turned on, whereby the voltage signal QV corresponding to the number Q of photoelectrons stored in the floating diffusion layer 118 is read from the signal read line 132. The source of the selection transistor 134 is connected to the signal read line 132.

The photoelectron discharger 108 has a third transfer unit 140 and a diffusion layer 142. The third transfer unit 140 has an MOS diode structure containing an electrode (third transfer gate) 144, which is formed on the p-type semiconductor substrate 102 with the insulator interposed therebetween, for transferring the photoelectrons generated in the photodetector 104 to the diffusion layer 142 (see FIG. 4).

The diffusion layer 142 is located on one side of the photodetector 104 with the third transfer unit 140 interposed therebetween. The power-supply voltage Vdd is applied from the power source 20 to the diffusion layer 142. When a gate drive signal voltage Se is input from the gate drive circuit 42 to the third transfer gate 144, the photoelectrons generated in the photodetector 104 are discharged (swept out) from the diffusion layer 142 through the third transfer unit 140. As shown in FIG. 3, the two photoelectron dischargers 108 are arranged in the vertical direction (the up-down direction) symmetrically with respect to the photodetector 104.

FIG. 5 is a timing chart of various basic gate drive signal voltages supplied to the photodetector 104, the photoelectron distributor 106*a*, and the photoelectron discharger 108*a* in the photoelectron transfer. FIGS. 6A to 6F are potential diagrams of the photodetector 104, the photoelectron distributor 106*a*, and the photoelectron discharger 108*a* at timings a to h shown in the timing chart of FIG. 5.

FIG. 6A is the potential diagram at the timings a and g, FIG. 6B is the potential diagram at the timings b and h, FIG. 6C is the potential diagram at the timing c, FIG. 6D is the potential diagram at the timing d, FIG. 6E is the potential diagram at the timing e, and FIG. 6F is the potential diagram at the timing f.

In one frame of exposure period, before the first light-receiving period P (in which the photoelectrons generated in the photodetector 104 are cumulatively stored), at the timing a, a high gate drive signal voltage Sa is applied to the photogate 110, a high gate drive signal voltage Se is applied to the third transfer gate 144, a low gate drive signal voltage Sb is applied to the first transfer gate 120, a high gate drive signal voltage Sc is applied to the hold gate 122, and a high gate drive signal voltage Sd is applied to the second transfer gate 124. Therefore, at the timing a, as shown in FIG. 6A, the photoelectrons generated in the photodetector 104 are transferred through the third transfer unit 140 to the diffusion layer 142 and can be discharged from the diffusion layer 142. Thus, the photoelectrons are not stored in the photodetector 104. Furthermore, at the timing a, as shown in FIG. 6A, the photoelectrons in the photoelectron hold unit 114 are transferred through the second transfer unit 116 to the floating diffusion layer 118. Therefore, when a high resetting signal R is applied to the reset gate 127, the photoelectrons in the photoelectron hold unit 114 and the floating diffusion layer 118 can be discharged through the reset transistor 126.

At the timing b, a low gate drive signal voltage Sc is applied to the hold gate 122. Therefore, as shown in FIG. 6B, all the photoelectrons in the photoelectron hold unit 114 are transferred to the floating diffusion layer 118. At this timing, when a high resetting signal R is applied to the reset gate 127, all the photoelectrons remaining in the photoelectron hold unit 114 and the floating diffusion layer 118 can be discharged. Since the high gate drive signal voltages Sa and Se are continuously applied to the photogate 110 and the third transfer gate 144 also at the timing b, the photoelectrons generated in the photodetector 104 are continuously discharged through the diffusion layer 142.

After all the photoelectrons remaining in the photoelectron hold unit 114 and the floating diffusion layer 118 are discharged, and immediately before the light-receiving period P, at the timing c, a high gate drive signal voltage Sc is applied to the hold gate 122, and a low gate drive signal voltage Sd is applied to the second transfer gate 124. Furthermore, immediately before the light-receiving period P, at the timing c, a low gate drive signal voltage Sa is applied to the photogate 110. Therefore, as shown in FIG. 6C, all the photoelectrons remaining in the photodetector 104 are discharged through the diffusion layer 142.

In the light-receiving period P, at the timing d, a low gate drive signal voltage Se is applied to the third transfer gate 144, and a high gate drive signal voltage Sb is applied to the first transfer gate 120. Therefore, at the timing d, as shown in FIG. 6D, the photoelectrons generated in the photodetector 104 are transferred through the first transfer unit 112 to the photoelectron hold unit 114. Thus, in the light-receiving period P, the photoelectrons generated in the photodetector 104 are cumulatively stored and held in the photoelectron hold unit 114. Since the high gate drive signal voltage Sc is continuously applied to the hold gate 122 also at the timing d, the potential of the photoelectron hold unit 114 is maintained at a low level.

In the light-receiving period P, at the timing e in a residual photoelectron transfer period, a low gate drive signal voltage Sa is applied to the photogate 110. Therefore, at the timing e, as shown in FIG. 6E, all the photoelectrons remaining in the photodetector 104 can be transferred to the photoelectron hold unit 114.

After the light-receiving period P (particularly after the residual photoelectron transfer period), at the timing f, a high gate drive signal voltage Sa is applied to the photogate 110, a high gate drive signal voltage Se is applied to the third transfer gate 144, and a low gate drive signal voltage Sb is applied to the first transfer gate 120. Therefore, at the timing f, as shown in FIG. 6F, since the high gate drive signal voltages Sa and Se are applied to the photogate 110 and the third transfer gate 144, the photoelectrons generated in the photodetector 104 are discharged through the diffusion layer 142. Furthermore, also at the timing f, since the high gate drive signal voltage Sc is continuously applied to the hold gate 122, the photoelectrons generated in the photodetector 104 in the light-receiving period P are continuously held in the photoelectron hold unit 114.

Though not shown in the drawings, the one frame of the exposure period includes a plurality of the light-receiving periods P. Thus, the processes shown in FIGS. 6C to 6F are repeated multiple times, and the photoelectrons generated in the photodetector 104 in the multiple light-receiving periods P are accumulated and held in the photoelectron hold unit 114.

In a readout period, at the timing g, a high gate drive signal voltage Sa is applied to the photogate 110, a high gate drive signal voltage Se is applied to the third transfer gate 144, a low gate drive signal voltage Sb is applied to the first transfer gate 120, a high gate drive signal voltage Sc is applied to the hold gate 122, and a high gate drive signal voltage Sd is applied to the second transfer gate 124. Therefore, at the timing g, as shown in FIG. 6A, the photoelectrons in the photoelectron hold unit 114 are transferred through the second transfer unit 116 to the floating diffusion layer 118. At the timing g, a low resetting signal R is applied to the reset gate 127, so that the transferred photoelectrons are not discharged and remain in the floating diffusion layer 118.

Then, at the timing h, a low gate drive signal voltage Sc is applied to the hold gate 122. Therefore, as shown in FIG. 6B, all the photoelectrons in the photoelectron hold unit 114 are transferred to the floating diffusion layer 118. Also at the timing h, a low resetting signal R is applied to the reset gate 127, so that the transferred photoelectrons are not discharged and remain in the floating diffusion layer 118. At the timings g and h, the photoelectrons generated in the photodetector 104 are discharged through the diffusion layer 142.

After all the photoelectrons held in the photoelectron hold unit 114 are transferred to the floating diffusion layer 118, when a high selection signal Ss is applied to the selection gate 135 of the selection transistor 134, the voltage signal QV corresponding to the number Q of photoelectrons in the floating diffusion layer 118 is read from the signal read line 132.

The photoelectron transfer processes in the photoelectron distributors 106b, 106c, and 106d are the same as in the photoelectron distributor 106a, and the photoelectron discharge process in the photoelectron discharger 108b is the same as in the photoelectron discharger 108a. Therefore, explanations thereof are omitted.

FIG. 7 is a view of an example of the circuit structure of the unit pixel 30. The photoelectrons generated in the photodetector 104 are transferred through transfer pathways 146a, 146b, 146c, and 146d to the floating diffusion layers 118 in the photoelectron distributors 106a, 106b, 106c, and 106d. Each of the transfer pathways 146a, 146b, 146c, and 146d contains the first transfer unit 112, the photoelectron hold unit 114, and the second transfer unit 116 in each of the photoelectron distributors 106a, 106b, 106c, and 106d shown in FIG. 3. The floating diffusion layers 118 in the photoelectron distributors 106a, 106b, 106c, and 106d are connected to the source of one reset transistor 126 and to one signal read gate 131. It should be noted that the photoelectron dischargers 108 are omitted in FIG. 7.

Before the photoelectrons held in the photoelectron hold unit 114 are transferred to the floating diffusion layer 118 in each of the photoelectron distributors 106a, 106b, 106c, and 106d, the reset transistor 126 is turned on to reset the floating diffusion layer 118 at the reference potential, and the voltage signal of the floating diffusion layer 118 at the time (hereinafter referred to as the black level) is read out. Then, the photoelectrons held in the photoelectron hold unit 114 are sequentially transferred to the floating diffusion layer 118 in each of the photoelectron distributors 106a, 106b, 106c, and 106d. The number Q of the transferred photoelectrons in each floating diffusion layer 118 is sequentially converted to the voltage signal (signal level) QV by the signal read transistor 130, and the voltage signal QV is read from the signal read line 132 through the selection transistor 134.

Specifically, the reset transistor 126 is turned on, whereby the potential of each floating diffusion layer 118 is reset to read the black level. Then, the photoelectrons held in the photoelectron hold unit 114 of the photoelectron distributor 106a are transferred to the floating diffusion layer 118, and the signal level QV corresponding to the number Q of the transferred photoelectrons in the floating diffusion layer 118 is read from the signal read line 132. In the arithmetic processing unit 16, the black level is subtracted from the signal level QV corresponding to the number Q of the photoelectrons held in the photoelectron hold unit 114 of the photoelectron distributor 106a, to remove the reset noise.

Next, the reset transistor 126 is turned on, whereby the potential of each floating diffusion layer 118 is reset to read the black level. Then, the photoelectrons held in the photoelectron hold unit 114 of the photoelectron distributor 106b are transferred to the floating diffusion layer 118, and the signal level QV corresponding to the number Q of the photoelectrons in the floating diffusion layer 118 is read from the signal read line 132. In the arithmetic processing unit 16, the black level is subtracted from the signal level QV corresponding to the number Q of the photoelectrons held in the photoelectron hold unit 114 of the photoelectron distributor 106b, to remove the reset noise.

Furthermore, the reset transistor 126 is turned on, whereby the potential of each floating diffusion layer 118 is reset to read the black level. Then, the photoelectrons held in the photoelectron hold unit 114 of the photoelectron distributor 106c are transferred to the floating diffusion layer 118, and the signal level QV corresponding to the number Q of the photoelectrons in the floating diffusion layer 118 is read from the signal read line 132. In the arithmetic processing unit 16, the black level is subtracted from the signal level QV corresponding to the number Q of the photoelectrons held in the photoelectron hold unit 114 of the photoelectron distributor 106c, to remove the reset noise.

Finally, the reset transistor 126 is turned on, whereby the potential of each floating diffusion layer 118 is reset to read the black level. Then, the photoelectrons held in the photoelectron hold unit 114 of the photoelectron distributor 106d are transferred to the floating diffusion layer 118, and the signal level QV corresponding to the number Q of the photoelectrons in the floating diffusion layer 118 is read from the signal read line 132. In the arithmetic processing unit 16, the black level is subtracted from the signal level QV corresponding to the number Q of the photoelectrons in the photoelectron hold unit 114 of the photoelectron distributor 106d, to remove the reset noise.

Figure 8:
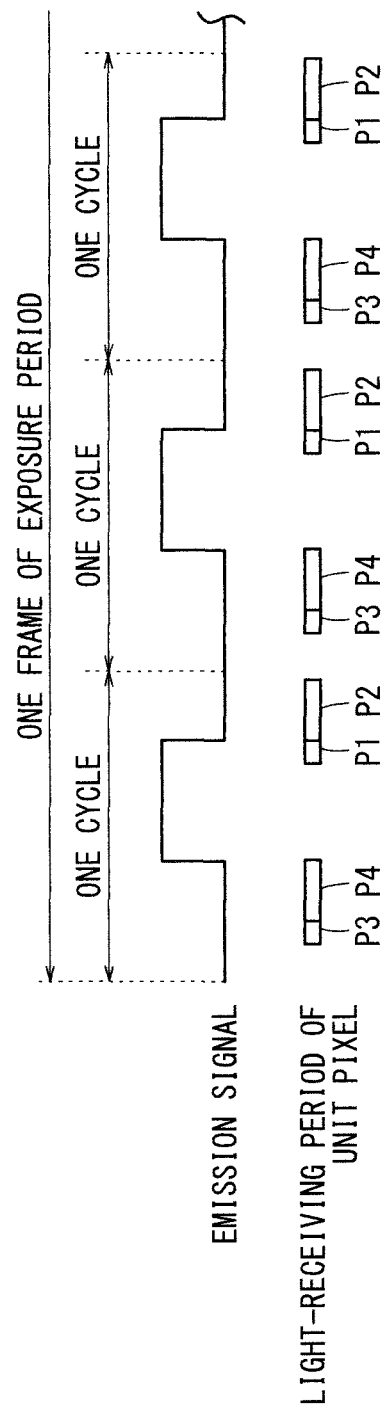
FIG. 8 is a time chart of a light-receiving period of the unit pixel.

FIG. 8 is a time chart of the light-receiving period P of the unit pixel 30. The control unit 18 outputs an emission signal to the irradiation unit 12 such that the irradiation unit 12 emits an emitted light Le at a predetermined cycle during one frame of the exposure period. The irradiation unit 12 emits the emitted light Le at the predetermined cycle based on the supplied emission signal. The unit pixel 30 receives a light in the predetermined light-receiving period P (first to fourth light-receiving periods P1 to P4) corresponding to the emission timing of the emitted light Le under control of the control unit 18.

In the first light-receiving period P1, the unit pixel 30 receives both of the reflected light Lr and the ambient light Ls, and cumulatively stores photoelectrons corresponding to the received lights. In the second light-receiving period P2, the unit pixel 30 receives the reflected light Lr and the ambient light Ls, and cumulatively stores photoelectrons corresponding to the received lights. The second light-receiving period P2 may include a period during which the unit pixel 30 does not receive the reflected light Lr (i.e., receives only the ambient light Ls). In the third and fourth light-receiving periods P3 and P4, the unit pixel 30 receives only the ambient light Ls, and cumulatively stores photoelectrons corresponding to the received light. The first and third light-receiving periods P1 and P3 have the same length, and the second and fourth light-receiving periods P2 and P4 have the same length. The second and fourth light-receiving periods P2 and P4 are longer than the first and third light-receiving periods P1 and P3. The light receiving start timings of the first to fourth light-receiving periods P1 to P4 are determined based on a distance-measurement detection range. The light receiving start timings of the first to fourth light-receiving periods P1 to P4 (particularly the second light-receiving period P2) depend on the distance-measurement detection range. When the target object W is located at a smaller distance from the unit pixel 30, the time from emission of the emitted light Le until reception of the reflected light Lr by the unit pixel 30 is shorter. When the target object W is located at a larger distance, the time from emission of the emitted light Le until reception of the reflected light Lr by the unit pixel 30 is longer. The distance-measurement detection range means a range in which the distance can be measured (e.g. a range of 5 to 20 m).

The four light-receiving periods P (P1 to P4) are determined depending on the emission timing of an emitted light Le, and are included in one cycle. This cycle is repeated predetermined times (e.g. 1000 times) during one frame of the exposure period. The photoelectrons generated in the first light-receiving period P1 are stored in the photoelectron hold unit 114 of the photoelectron distributor 106a, the photoelectrons generated in the second light-receiving period P2 are stored in the photoelectron hold unit 114 of the photoelectron distributor 106b, the photoelectrons generated in the third light-receiving period P3 are stored in the photoelectron hold unit 114 of the photoelectron distributor 106c, and the photoelectrons generated in the fourth light-receiving period P4 are stored in the photoelectron hold unit 114 of the photoelectron distributor 106d.

In one cycle, the photoelectrons generated in each light-receiving period P (each of the first to fourth light-receiving periods P1 to P4) are allocated to the corresponding photoelectron distributor 106. Therefore, the photoelectrons generated in each light-receiving period P in the cycles are accumulated and held in the photoelectron hold unit 114 of the corresponding photoelectron distributor 106. Thus, the photoelectrons generated in the first light-receiving periods P1 in the cycles are accumulated and held in the photoelectron hold unit 114 of the photoelectron distributor 106a, the photoelectrons generated in the second light-receiving periods P2 in the cycles are accumulated and held in the photoelectron hold unit 114 of the photoelectron distributor 106b, the photoelectrons generated in the third light-receiving periods P3 in the cycles are accumulated and held in the photoelectron hold unit 114 of the photoelectron distributor 106c, and the photoelectrons generated in the fourth light-receiving periods P4 in the cycles are accumulated and held in the photoelectron hold unit 114 of the photoelectron distributor 106d.

After one frame of the exposure period, in the readout period, the voltage signal QV corresponding to the number Q of the photoelectrons held in the photoelectron hold unit 114 in each photoelectron distributor 106 is read out.

Figure 9:
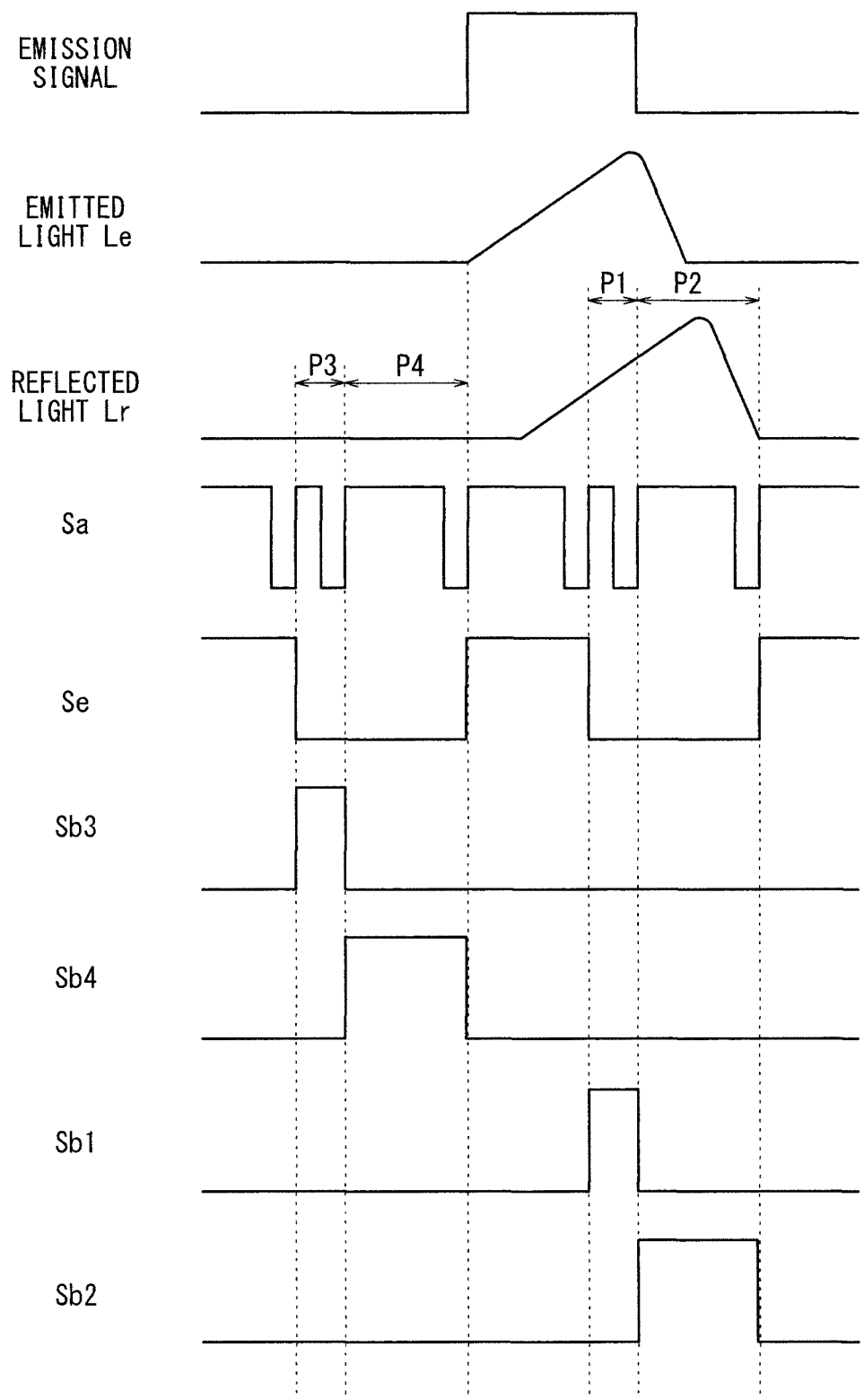
FIG. 9 is a time chart of a timing at which a light is emitted by an irradiation unit in one cycle of FIG. 8 and a timing at which a gate drive signal voltage is supplied to the unit pixel in one cycle of FIG. 8.

FIG. 9 is a time chart of a timing at which the emitted light Le is emitted by the irradiation unit 12 in one cycle of FIG. 8 and a timing at which a gate drive signal voltage is supplied to the unit pixel 30 in one cycle of FIG. 8.

The emitted light Le, which is emitted by the irradiation unit 12 based on the emission signal from the control unit 18, is a ramp-shaped (approximately triangle-shaped) pulsed light. The emitted light Le exhibits a period during which the intensity of the emitted light Le rises (hereinafter referred to as the rise period) and a period during which the intensity falls (hereinafter referred to as the fall period). Accordingly, the reflected light Lr which is incident on the solid-state image sensing device 28 also exhibits a period during which the intensity of the reflected light Lr rises and a period during which the intensity falls. As long as a high emission signal is supplied from the control unit 18 to the irradiation unit 12, the intensity of the emitted light Le is increased.

In the first light-receiving period P1, the unit pixel 30 receives the reflected light Lr from the target object W located within the distance-measurement detection range. The first light-receiving period P1 is a part of the rise period of the reflected light Lr. In the second light-receiving period P2, the unit pixel 30 receives the reflected light Lr from the target object W located within the distance-measurement detection range. The second light-receiving period P2 includes a time point at which the intensity of the reflected light Lr reach a peak, and the fall period of the reflected light Lr.

In the solid-state image sensing device 28, the unit pixel 30 acts to cumulatively store the photoelectrons corresponding to the reflected light Lr which is incident on the photodetector 104 in the first to fourth light-receiving periods P1 to P4 and to discharge (drain) the photoelectrons generated in the photodetector 104 during periods other than the first to fourth light-receiving periods P1 to P4.

Specifically, before the third light-receiving period P3, a high gate drive signal voltage Sa is supplied to the photogate 110 of the photodetector 104, and a high gate drive signal voltage Se is supplied to the third transfer gate 144 of the third transfer unit 140. Therefore, the photoelectrons generated in the photodetector 104 are discharged through the diffusion layer 142. Then, immediately before the third light-receiving period P3, the high gate drive signal voltage Sa for the photogate 110 is converted to a low state, and all the photoelectrons remaining in the photodetector 104 are discharged through the diffusion layer 142.

In the above process, the gate drive signal voltage Sb supplied to the first transfer gate 120 in the first transfer unit 112 of the photoelectron distributor 106a (hereinafter referred to as Sb1), the gate drive signal voltage Sb supplied to that of the photoelectron distributor 106b (hereinafter referred to as Sb2), the gate drive signal voltage Sb supplied to that of the photoelectron distributor 106c (hereinafter referred to as Sb3), and the gate drive signal voltage Sb supplied to that of the photoelectron distributor 106d (hereinafter referred to as Sb4) are in the low states.

At the start of the third light-receiving period P3, the gate drive signal voltage Se for the third transfer gate 144 is converted to the low state, and the gate drive signal voltage Sb3 for the first transfer gate 120 of the photoelectron distributor 106c is converted to the high state. Therefore, the photoelectrons generated in the photodetector 104 in the third light-receiving period P3 are cumulatively stored in the photoelectron hold unit 114 of the photoelectron distributor 106c. In the residual photoelectron transfer period within the third light-receiving period P3, the gate drive signal voltage Sa for the photogate 110 is converted to the low state. Therefore, all the photoelectrons generated in the photodetector 104 are transferred to the photoelectron hold unit 114 of the photoelectron distributor 106c. It goes without saying that the high gate drive signal voltage Sc is supplied to the hold gate 122 of the photoelectron hold unit 114 of the photoelectron distributor 106c.

At the start of the fourth light-receiving period P4, the gate drive signal voltage Sa for the photogate 110 is converted to the high state, the gate drive signal voltage Sb3 for the first transfer gate 120 of the photoelectron distributor 106c is converted to the low state, and the gate drive signal voltage Sb4 for the first transfer gate 120 of the photoelectron distributor 106d is converted to the high state. Therefore, the photoelectrons generated in the photodetector 104 in the fourth light-receiving period P4 are cumulatively stored in the photoelectron hold unit 114 of the photoelectron distributor 106d. In the residual photoelectron transfer period within the fourth light-receiving period P4, the gate drive signal voltage Sa for the photogate 110 is converted to the low state. Therefore, all the photoelectrons generated in the photodetector 104 are transferred to the photoelectron hold unit 114 of the photoelectron distributor 106d. It goes without saying that the high gate drive signal voltage Sc is supplied to the hold gate 122 of the photoelectron hold unit 114 of the photoelectron distributor 106d. At the end of the fourth light-receiving period P4, the gate drive signal voltage Sa for the photogate 110 is converted to the high state, the gate drive signal voltage Se for the third transfer gate 144 is converted to the high state, and the gate drive signal voltage Sb4 for the first transfer gate 120 of the photoelectron distributor 106d is converted to the low state. Therefore, the photoelectrons generated in the photodetector 104 are discharged through the diffusion layer 142. Then, immediately before the first light-receiving period P1, the high gate drive signal voltage Sa for the photogate 110 is converted to the low state, and all the photoelectrons remaining in the photodetector 104 are discharged through the diffusion layer 142.

At the start of the first light-receiving period P1, the gate drive signal voltage Se for the third transfer gate 144 is converted to the low state, and the gate drive signal voltage Sb1 for the first transfer gate 120 of the photoelectron distributor 106a is converted to the high state. Therefore, the photoelectrons generated in the photodetector 104 in the first light-receiving period P1 are cumulatively stored in the photoelectron hold unit 114 of the photoelectron distributor 106a. In the residual photoelectron transfer period within the first light-receiving period P1, the gate drive signal voltage Sa for the photogate 110 is converted to the low state. Therefore, all the photoelectrons generated in the photodetector 104 are transferred to the photoelectron hold unit 114 of the photoelectron distributor 106a. It goes without saying that the high gate drive signal voltage Sc is supplied to the hold gate 122 of the photoelectron hold unit 114 of the photoelectron distributor 106a.

At the start of the second light-receiving period P2, the gate drive signal voltage Sa for the photogate 110 is converted to the high state, the gate drive signal voltage Sb1 for the first transfer gate 120 of the photoelectron distributor 106a is converted to the low state, and the gate drive signal voltage Sb2 for the first transfer gate 120 of the photoelectron distributor 106b is converted to the high state. Therefore, the photoelectrons generated in the photodetector 104 in the second light-receiving period P2 are cumulatively stored in the photoelectron hold unit 114 of the photoelectron distributor 106b. In the residual photoelectron transfer period within the second light-receiving period P2, the gate drive signal voltage Sa for the photogate 110 is converted to the low state. Therefore, all the photoelectrons generated in the photodetector 104 are transferred to the photoelectron hold unit 114 of the photoelectron distributor 106b. It goes without saying that the high gate drive signal voltage Sc is supplied to the hold gate 122 of the photoelectron hold unit 114 of the photoelectron distributor 106b. At the end of the second light-receiving period P2, the gate drive signal voltage Sa for the photogate 110 is converted to the high state, the gate drive signal voltage Se for the third transfer gate 144 is converted to the high state, and the gate drive signal voltage Sb2 for the first transfer gate 120 of the photoelectron distributor 106b is converted to the low state. Therefore, the photoelectrons generated in the photodetector 104 are discharged through the diffusion layer 142.

A method for calculating the distance to the target object W in the arithmetic processing unit 16, based on the voltage signals (the signal levels and the black levels) read from the unit pixels 30 in the solid-state image sensing device 28, will be described below.

Before the calculation of the distance to the target object W, in the arithmetic processing unit 16, the black level is subtracted from the signal level QV read from the photoelectron hold unit 114 of each photoelectron distributor 106, whereby the reset noise is removed to obtain a voltage signal QV'.

The number Q of the photoelectrons transferred from the photoelectron hold unit 114 to the floating diffusion layer 118 in the photoelectron distributor 106a is referred to as the photoelectron number Qa, the readout voltage signal (signal level) QV corresponding to the photoelectron number Qa of the floating diffusion layer 118 is referred to as the signal level QVa, and the voltage signal QV' obtained by subtracting the black level from the signal level QVa is referred to as the voltage signal QV'a. The number Q of the photoelectrons transferred from the photoelectron hold unit 114 to the floating diffusion layer 118 in the photoelectron distributor 106b is referred to as the photoelectron number Qb, the readout voltage signal (signal level) QV corresponding to the photoelectron number Qb of the floating diffusion layer 118 is referred to as the signal level QVb, and the voltage signal QV' obtained by subtracting the black level from the signal level QVb is referred to as the voltage signal QV'b.

Similarly, the number Q of the photoelectrons transferred from the photoelectron hold unit 114 to the floating diffusion layer 118 in the photoelectron distributor 106c is hereinafter referred to as the photoelectron number Qc, the readout voltage signal (signal level) QV corresponding to the photoelectron number Qc of the floating diffusion layer 118 is referred to as the signal level QVc, and the voltage signal QV' obtained by subtracting the black level from the signal level QVc is referred to as the voltage signal QV'c. The number Q of the photoelectrons transferred from the photoelectron hold unit 114 to the floating diffusion layer 118 in the photoelectron distributor 106d is hereinafter referred to as the photoelectron number Qd, the readout voltage signal (signal level) QV corresponding to the photoelectron number Qd of the floating diffusion layer 118 is referred to as the signal level QVd, and the voltage signal QV' obtained by subtracting the black level from the signal level QVd is referred to as the voltage signal QV'd. The arithmetic processing unit 16 calculates the distance to the target object W using the voltage signals QV'a, QV'b, QV'c, and QV'd.

Figure 10:
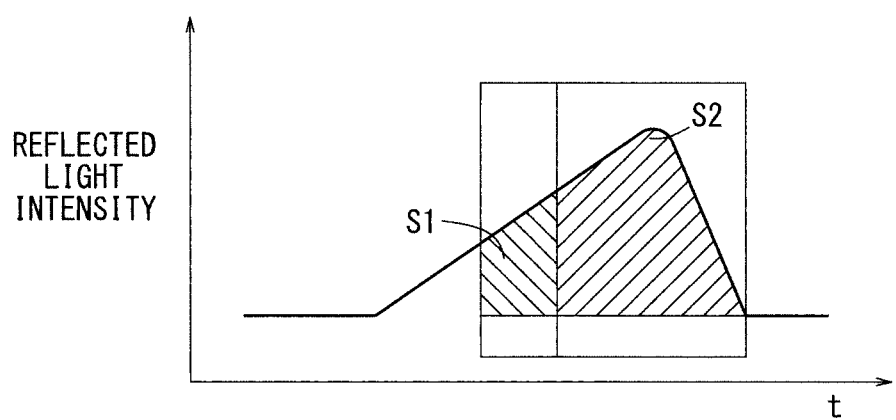
FIG. 10 is an explanatory view of a method for calculating a distance to a target object.

FIG. 10 is an explanatory view of the method for calculating the distance to the target object W. S1 represents the energy of the reflected light Lr which is incident on the unit pixel 30 in the first light-receiving period P1, and S2 represents the energy of the reflected light Lr which is incident on the unit pixel 30 in the second light-receiving period P2. When the target object W is located at a smaller distance from the distance measuring system 10, it takes a shorter time to return the reflected light Lr from the target object W, so that the reflected light Lr shown in FIG. 10 shifts to the left. On the other hand, when the target object W is located at a larger distance from the distance measuring system 10, it takes a longer time to return the reflected light Lr from the target object W, so that the reflected light Lr shown in FIG. 10 shifts to the right.

Thus, without regard for the emission intensity variation of the light emitter 24 in the irradiation unit 12, the reflectance of the target object W, and the like, the energy S1 of the reflected light Lr incident on the unit pixel 30 in the first light-receiving period P1 varies depending on the round trip time $\Delta t$ of the light to and from the target object W and can be represented by $f1(\Delta t)$. Similarly, the energy S2 of the reflected light Lr incident on the unit pixel 30 in the second light-receiving period P2 varies depending on the round trip time $\Delta t$ of the light and can be represented by $f2(\Delta t)$.

Considering the emission intensity variation of the light emitter 24, the reflectance of the target object W, and the like, the energy S1 of the reflected light Lr incident on the unit pixel 30 in the first light-receiving period P1 can be represented by $I \times f1(\Delta t)$, and the energy S2 of the reflected light Lr incident on the unit pixel 30 in the second light-receiving period P2 can be represented by $I \times f2(\Delta t)$. The character "I" represents a coefficient based on the emission intensity variation of the light emitter 24, the reflectance of the target object W, and the like.

Consequently, the light energy ratio (S2/S1) of the light energy S2 to the light energy S1 can be represented by the following expression 1:

$$\text{Light energy ratio} = \frac{S2}{S1} = \frac{I \times f2(\Delta t)}{I \times f1(\Delta t)} = \frac{f2(\Delta t)}{f1(\Delta t)} \quad (1)$$

Thus-obtained light energy ratio (S2/S1) depends on the light round trip time $\Delta t$ regardless of the emission intensity variation of the light emitter 24, the reflectance of the target object W, and the like. Therefore, by using a table containing the relation between the light round trip time $\Delta t$ and the light energy ratio (S2/S1), the light round trip time $\Delta t$ corresponding to the light energy ratio (S2/S1) can be determined, and the distance to the target object W can be obtained from the light round trip time $\Delta t$. This table may be stored in the arithmetic processing unit 16 or an external recording medium.

The energy S1 of the reflected light Lr incident on the unit pixel 30 in the first light-receiving period P1 corresponds to the voltage signal QV', which is obtained by subtracting the black level from the signal level QV corresponding to the number Q of the photoelectrons generated by the reflected light Lr incident on the unit pixel 30 in the first light-receiving period P1. The energy S2 of the reflected light Lr incident on the unit pixel 30 in the second light-receiving period P2 corresponds to the voltage signal QV', which is obtained by subtracting the black level from the signal level QV corresponding to the number Q of the photoelectrons generated by the reflected light Lr incident on the unit pixel 30 in the second light-receiving period P2.

The voltage signal QV'a, which is obtained based on the number Qa of the photoelectrons transferred from the photoelectron hold unit 114 to the floating diffusion layer 118 in the photoelectron distributor 106a, corresponds to the reflected light Lr and the ambient light Ls received in the first light-receiving period P1. Therefore, by subtracting the voltage signal QV'c, which is obtained based on the number Qc of the photoelectrons generated in the third light-receiving period P3, from the voltage signal QV'a, a voltage signal corresponding only to the reflected light Lr received in the first light-receiving period P1 can be obtained.

The voltage signal QV'b, which is obtained based on the number Qb of the photoelectrons transferred from the photoelectron hold unit 114 to the floating diffusion layer 118 in the photoelectron distributor 106b, corresponds to the reflected light Lr and the ambient light Ls received in the second light-receiving period P2. Therefore, by subtracting the voltage signal QV'd, which is obtained based on the number Qd of the photoelectrons generated in the fourth light-receiving period P4, from the voltage signal QV'b, a voltage signal corresponding only to the reflected light Lr received in the second light-receiving period P2 can be obtained. Thus, the light energy ratio of the light energy S2 to the light energy S1 can be represented by the following expression 2:

$$\text{Light energy ratio} = \frac{S2}{S1} = \frac{QV'b - QV'd}{QV'a - QV'c} = \frac{f2(\Delta t)}{f1(\Delta t)} \quad (2)$$

In the arithmetic processing unit 16, the light energy ratio (S2/S1) can be determined from the voltage signals QV'a, QV'b, QV'c, and QV'd using the expression 2, and the distance to the target object W can be calculated from the obtained light energy ratio (S2/S1).

The emitted light Le emitted by the irradiation unit 12 has a ramp-shaped waveform, and thus exhibits the rise period (during which the intensity of the emitted light Le rises) and the fall period (during which the intensity falls). The first light-receiving period P1 is a part of the rise period, and the second light-receiving period P2 includes the peak point and the fall period of the reflected light Lr. In a case where the target object W is closer to (is located at a smaller distance from) the distance measuring system 10, the reflected light Lr reaches the unit pixel 30 of the solid-state image sensing device 28 in a shorter time. Therefore, in this case, the light energy S1 of the reflected light Lr received in the first light-receiving period P1 is increased, and the light energy S2 of the reflected light Lr received in the second light-receiving period P2 is decreased. Thus, when the target object W is located at a smaller distance, the light energy ratio (S2/S1) is smaller.

In contrast, in a case where the target object W is farther from (is located at a larger distance from) the distance measuring system 10, the reflected light Lr reaches the unit pixel 30 of the solid-state image sensing device 28 in a longer time. Therefore, in this case, the light energy S1 of the reflected light Lr received in the first light-receiving period P1 is decreased, and the light energy S2 of the reflected light Lr received in the second light-receiving period P2 is increased. Thus, when the target object W is located at a larger distance, the light energy ratio (S2/S1) is larger.

Figure 11:
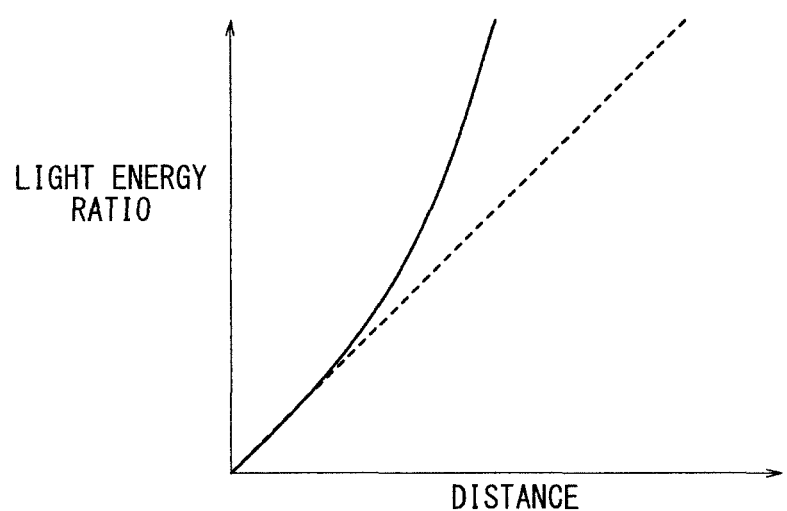
FIG. 11 is a graph showing a relationship between a light energy ratio and the distance to the target object.

FIG. 11 is a graph showing a relationship between a light energy ratio and the distance to the target object W. The solid line represents a relationship according to this embodiment between the light energy ratio and the distance to the target object W. The dashed line represents a relationship between the light energy ratio and the distance to the target object W obtained in a case where the emitted light Le emitted by the irradiation unit 12 is a square-wave pulsed light. As shown in FIG. 11, since the emitted light Le is ramp-shaped in the present embodiment, as the distance to the target object W is larger, the light energy ratio (S2/S1) in the present embodiment increases more than in the case of using the square-wave light. Consequently, the distance resolution can be improved to accurately measure the distance to the target object W.

The first light-receiving period P1 is shorter than the second light-receiving period P2. Therefore, even when the target object W is located at a smaller distance, the light energy S1 of the light received by the unit pixel 30 in the first light-receiving period P1 can be prevented from being excessively increased, and accordingly the number of the photoelectrons generated in the first light-receiving period P1 can be prevented from being excessively increased. Thus, it is not necessary to increase the capacity of the photoelectron hold unit 114 of the photoelectron distributor 106a. Furthermore, when the target object W is located at a smaller distance, the light energy S2 of the light received by the unit pixel 30 in the second light-receiving period P2 is smaller, and accordingly the number of the photoelectrons generated in the second light-receiving period P2 is smaller. Thus, it is not necessary to increase the capacity of the photoelectron hold unit 114 of the photoelectron distributor 106b.

When the target object W is located at a larger distance, the reflected light Lr received by the unit pixel 30 has a lower intensity. Accordingly, the light energy S2 of the reflected light Lr received by the unit pixel 30 in the second light-receiving period P2 is smaller, and thus the number of the photoelectrons generated in the second light-receiving period P2 is smaller. Thus, it is not necessary to increase the capacity of the photoelectron hold unit 114 of the photoelectron distributor 106b.

The above embodiment may be modified as follows.

Modified Example 1

In the above embodiment, one distance-measurement detection range is used, and the light-receiving start timings of the first to fourth light-receiving periods P1 to P4 are predetermined in correspondence to the emission timing of the emitted light Le based on the distance-measurement detection range. In Modified Example 1, a plurality of distance-measurement detection ranges are prepared, and the light-receiving start timings of the first to fourth light-receiving periods P1 to P4 may be determined for each of the distance-measurement detection ranges. The start timings of the first to fourth light-receiving periods P1 to P4 vary depending on the distance-measurement detection ranges. The distance-measurement detection range is switched at least for each frame of the exposure period.

For example, it is assumed that distance-measurement detection ranges 1 to 3 are provided. In the exposure period of the first frame, the first to fourth light-receiving periods P1 to P4 are determined in correspondence to the emission timing of the emitted light Le based on the distance-measurement detection range 1, and the photoelectrons corresponding to the light received in the first to fourth light-receiving periods P1 to P4 are cumulatively stored in the unit pixel 30. The distance to the target object W located within the distance-measurement detection range 1 is obtained by the arithmetic processing unit 16 using the numbers of the photoelectrons generated in the first to fourth light-receiving periods P1 to P4. In the exposure period of the second frame, the first to fourth light-receiving periods P1 to P4 are determined corresponding to the emission timing of the emitted light Le based on the distance-measurement detection range 2, and the photoelectrons corresponding to the light received in the first to fourth light-receiving periods P1 to P4 are cumulatively stored in the unit pixel 30. The distance to the target object W located within the distance-measurement detection range 2 is obtained by the arithmetic processing unit 16 using the numbers of the photoelectrons generated in the first to fourth light-receiving periods P1 to P4. In the exposure period of the third frame, the first to fourth light-receiving periods P1 to P4 are determined in correspondence to the emission timing of the emitted light Le based on the distance-measurement detection range 3, and the photoelectrons corresponding to the light received in the first to fourth light-receiving periods P1 to P4 are cumulatively stored in the unit pixel 30. The distance to the target object W located within the distance-measurement detection range 3 is obtained by the arithmetic processing unit 16 using the numbers of the photoelectrons generated in the first to fourth light-receiving periods P1 to P4. Consequently, the distance-measurement range can be expanded.

Modified Example 2

Figure 12:
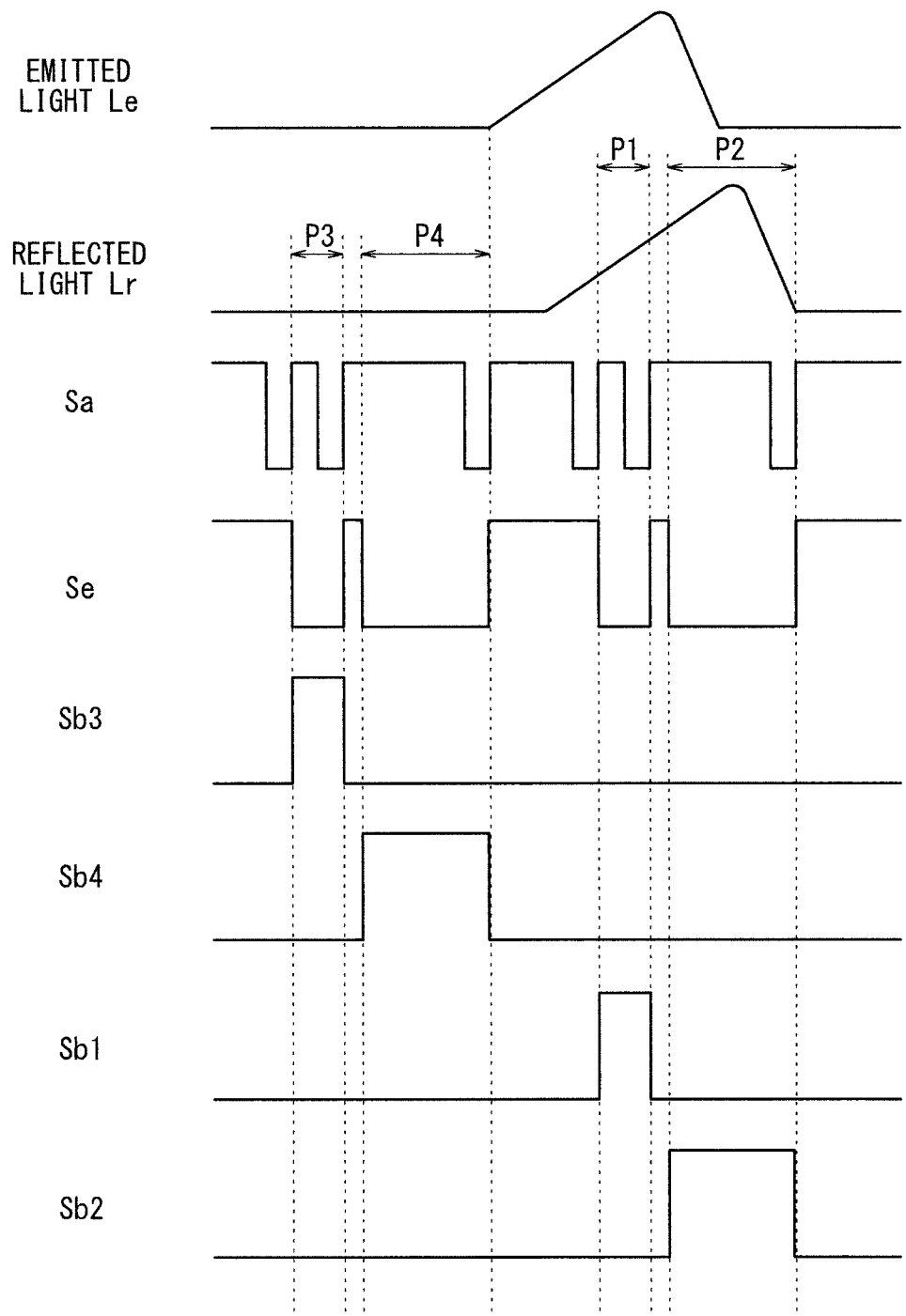
FIG. 12 is a time chart of a timing at which a light is emitted by the irradiation unit in one cycle of Modified Example 2 and a timing at which a gate drive signal voltage is supplied to the unit pixel in the one cycle of Modified Example 2.

In the above embodiment, as shown in FIG. 9, the second light-receiving period P2 is started at the end of the first light-receiving period P1. Alternatively, as shown in FIG. 12, the second light-receiving period P2 may be started after the elapse of a predetermined period of time from the end of the first light-receiving period P1. In this case, during the predetermined period of time between the end of the first light-receiving period P1 and the start of the second light-receiving period P2, the high gate drive signal voltages Sa and Se are applied to the photogate 110 and the third transfer gate 144 to discharge the photoelectrons generated in the photodetector 104 through the diffusion layer 142. Thus, a photoelectron discharge period is set between the first light-receiving period P1 and the second light-receiving period P2.

Similarly, in the above embodiment, the fourth light-receiving period P4 is started at the end of the third light-receiving period P3. Alternatively, the fourth light-receiving period P4 may be started after the elapse of a predetermined period of time from the end of the third light-receiving period P3. In this case, during the predetermined period of time between the end of the third light-receiving period P3 and the start of the fourth light-receiving period P4, the high gate drive signal voltages Sa and Se are applied to the photogate 110 and the third transfer gate 144 to discharge the photoelectrons generated in the photodetector 104 through the diffusion layer 142. Thus, a photoelectron discharge period is set between the third light-receiving period P3 and the fourth light-receiving period P4. At the end of each photoelectron discharge period between the light-receiving periods, the gate drive signal voltage Sa for the photogate 110 may be converted to the low state thereby to discharge the residual electrons. When the discharge periods are set immediately before the light-receiving periods P in this manner, the discharge and light-receiving processes can be carried out at the same timing in the light-receiving periods P. Thus, in the light-receiving periods P, the discharge process and the subsequent light-receiving process can be carried out under the same conditions, whereby the detection accuracy can be improved.

Modified Example 3

In the above embodiment, the voltage signal QV'c obtained in the third light-receiving period P3 is subtracted from the voltage signal QV'a obtained in the first light-receiving period P1, and the voltage signal QV'd obtained in the fourth light-receiving period P4 is subtracted from the voltage signal QV'b obtained in the second light-receiving period P2. In a case where the ambient light Ls hardly enters the unit pixel 30 (for example when the distance measurement is carried out at night), the voltage signals QV'c and QV'd may be considered as 0. In this case, it is not necessary to cumulatively store the photoelectrons in the third and fourth light-receiving periods P3 and P4. The photoelectrons generated in the third and fourth light-receiving periods P3 and P4 may be discharged from the diffusion layer 142.

Although the present invention has been described with reference to the above embodiment, the scope of the invention is not limited to the embodiment. It will be apparent to those skilled in the art that various changes and modifications may be made to the embodiment without departing from the scope of the invention as set forth in the appended claims.

What is claimed is:
1. A distance measuring system comprising:
an irradiation unit for emitting a pulsed light to a target object, wherein the pulsed light is reflected by the target object;
a solid-state image sensing device for generating photoelectrons depending on the energy of the reflected light received in a light-receiving period predetermined for the emission timing of the pulsed light, and cumulatively storing therein the generated photoelectrons; and
an arithmetic processing unit for determining a distance to the target object according to a time-of-flight process using information concerning the photoelectrons cumulatively stored in the solid-state image sensing device, wherein:
the light-receiving period includes a first light-receiving period and a second light-receiving period;
the solid-state image sensing device cumulatively stores therein photoelectrons generated depending on the energy of the light received in the first light-receiving period, and also cumulatively stores therein photoelectrons generated depending on the energy of the light received in the second light-receiving period;
the first light-receiving period is a part of a rise period during which the intensity of the reflected light received by the solid-state image sensing device rises, and the second light-receiving period includes a peak point of the intensity of the reflected light received by the solid-state image sensing device and a fall period during which the intensity thereof falls; and
the arithmetic processing unit determines the distance to the target object using a light energy ratio obtained by dividing information concerning the photoelectrons cumulatively stored in the second light-receiving period by information concerning the photoelectrons cumulatively stored in the first light-receiving period.

2. The distance measuring system according to claim 1, wherein
the first light-receiving period is shorter than the second light-receiving period.

3. The distance measuring system according to claim 1, further comprising a table storing therein the light energy ratios corresponding to various distances to the target object.

4. The distance measuring system according to claim 1, wherein
the solid-state image sensing device does not store, but discharges photoelectrons generated depending on the energy of the light received in periods other than the light-receiving period.

5. The distance measuring system according to claim 1, wherein
the irradiation unit emits the pulsed light a predetermined number of times,
the first light-receiving period and the second light-receiving period are predetermined for each emission timing of the pulsed light,
the solid-state image sensing device accumulates and cumulatively stores therein photoelectrons generated depending on the energies of the lights received in the first light-receiving periods,
the solid-state image sensing device also accumulates and cumulatively stores therein photoelectrons generated depending on the energies of the lights received in the second light-receiving periods, and
the arithmetic processing unit determines the light energy ratio by dividing information concerning the photoelectrons cumulatively stored in the second light-receiving periods by information concerning the photoelectrons cumulatively stored in the first light-receiving periods.

6. The distance measuring system according to claim 1, wherein
the light-receiving period further includes a third light-receiving period having the same length as the first light-receiving period, and a fourth light-receiving period having the same length as the second light-receiving period,
only an ambient light is received by the solid-state image sensing device in each of the third light-receiving period and the fourth light-receiving period,
the solid-state image sensing device further cumulatively stores therein photoelectrons generated depending on the energy of the ambient light received in the third light-receiving period,
the solid-state image sensing device still further cumulatively stores therein photoelectrons generated depending on the energy of the ambient light received in the fourth light-receiving period, and
the arithmetic processing unit determines the light energy ratio by dividing a value obtained by subtracting information concerning the photoelectrons cumulatively stored in the fourth light-receiving period from information concerning the photoelectrons cumulatively stored in the second light-receiving period, by a value obtained by subtracting information concerning the photoelectrons cumulatively stored in the third light-receiving period from information concerning the photoelectrons stored in the first light-receiving period.

7. The distance measuring system according to claim 6, wherein
the irradiation unit emits the pulsed light a predetermined number of times,
the first light-receiving period, the second light-receiving period, the third light-receiving period, and the fourth light-receiving period are predetermined for each emission timing of the pulsed light,
the solid-state image sensing device accumulates and cumulatively stores therein photoelectrons generated depending on the energies of the lights received in the first light-receiving periods,
the solid-state image sensing device also accumulates and cumulatively stores therein photoelectrons generated depending on the energies of the lights received in the second light-receiving periods,
the solid-state image sensing device further accumulates and cumulatively stores therein photoelectrons generated depending on the energies of the lights received in the third light-receiving periods,
the solid-state image sensing device still further accumulates and cumulatively stores therein photoelectrons generated depending on the energies of the lights received in the fourth light-receiving periods, and
the arithmetic processing unit determines the light energy ratio by dividing a value obtained by subtracting information concerning the photoelectrons cumulatively stored in the fourth light-receiving periods from information concerning the photoelectrons cumulatively stored in the second light-receiving periods, by a value obtained by subtracting information concerning the photoelectrons cumulatively stored in the third light-receiving periods from information concerning the photoelectrons cumulatively stored in the first light-receiving periods.

8. The distance measuring system according to claim 1, wherein
the light-receiving period predetermined for the emission timing of the pulsed light is determined based on a predetermined distance-measurement detection range.

9. The distance measuring system according to claim 8, wherein
the distance measuring system has a plurality of different distance-measurement detection ranges,
the light-receiving start timing of the light-receiving period differs depending on the distance-measurement detection ranges,
the distance-measurement detection range is switched at least for each frame of exposure period, and
the one frame of exposure period includes a plurality of the first light-receiving periods and the second light-receiving periods.

10. A distance measuring method carried out using a distance measuring system,
the distance measuring system including:
an irradiation unit for emitting a pulsed light to a target object, wherein the pulsed light is reflected by the target object;
a solid-state image sensing device for generating photoelectrons depending on the energy of the reflected light received in a light-receiving period predetermined for the emission timing of the pulsed light, and cumulatively storing therein the generated photoelectrons; and
an arithmetic processing unit for determining a distance to the target object according to a time-of-flight process using information concerning the photoelectrons cumulatively stored in the solid-state image sensing device,
wherein:
the light-receiving period includes a first light-receiving period and a second light-receiving period; and
the first light-receiving period is a part of a rise period during which the intensity of the reflected light received by the solid-state image sensing device rises, and the second light-receiving period includes a peak point of the intensity of the reflected light received by the solid-state image sensing device and a fall period during which the intensity thereof falls,
the method comprising:
with the solid-state image sensing device, cumulatively storing therein photoelectrons generated depending on the energy of the light received in the first light-receiving period, and also cumulatively storing therein photoelectrons generated depending on the energy of the light received in the second light-receiving period; and
with the arithmetic processing unit, determining the distance to the target object using a light energy ratio obtained by dividing information concerning the photoelectrons cumulatively stored in the second light-receiving period by information concerning the photoelectrons cumulatively stored in the first light-receiving period.

* * * * *